US007365757B1

(12) United States Patent
Callway et al.

(10) Patent No.: US 7,365,757 B1
(45) Date of Patent: Apr. 29, 2008

(54) METHOD AND APPARATUS FOR INDEPENDENT VIDEO AND GRAPHICS SCALING IN A VIDEO GRAPHICS SYSTEM

(75) Inventors: Edward G. Callway, Toronto (CA); Allen J. C. Porter, Sunderland (CA); Chun-Chin David Yeh, North York (CA); Philip L. Swan, Richmond Hill (CA)

(73) Assignee: ATI International SRL, Christchurch (BB)

( * ) Notice: Subject to any disclaimer, the term of this patent is extended or adjusted under 35 U.S.C. 154(b) by 761 days.

(21) Appl. No.: 09/213,748

(22) Filed: Dec. 17, 1998

(51) Int. Cl.
*G09G 5/00* (2006.01)
*H04N 9/74* (2006.01)

(52) U.S. Cl. ...................... 345/629; 345/660; 348/581; 348/584; 348/589

(58) Field of Classification Search ................ 345/127, 345/439, 418, 660, 629, 630-32, 541, 542, 345/502, 543, 617, 634, 546, 501, 667, 505, 345/506, 668, 519, 540; 348/445, 571, 556, 348/441, 581, 589, 597, 584, 668, 546; 710/244
See application file for complete search history.

(56) References Cited

U.S. PATENT DOCUMENTS 5,574,572 A * 11/1996 Malinowski et al. ....... 358/451
5,764,201 A * 6/1998 Ranganathan ............... 345/660
5,784,046 A * 7/1998 Cahill, III ................... 345/667
5,912,710 A * 6/1999 Fujimoto .................... 348/445
6,014,125 A * 1/2000 Herbert ...................... 345/127
6,064,437 A * 5/2000 Phan et al. ................. 348/446
6,078,328 A * 6/2000 Schumann et al. ......... 345/418
6,121,978 A * 9/2000 Miler ......................... 345/629
6,189,064 B1 * 2/2001 MacInnis et al. ........... 710/244
6,208,354 B1 * 3/2001 Porter ........................ 345/660
6,307,559 B1 * 10/2001 Hancock et al. ............ 345/660

OTHER PUBLICATIONS

Microsoft Press, "Microsoft Press Computer Dictionary" third edition, 1997.*

* cited by examiner

*Primary Examiner*—Chante Harrison
(74) *Attorney, Agent, or Firm*—Vedder Price P.C.

(57) ABSTRACT

A method and apparatus for independent video and graphics scaling in a video graphics system is accomplished by receiving a video data stream, wherein the video data stream includes video data in a first format. A graphics data stream is also received, and the graphics data stream includes graphics data in a second format. The video data of the video data stream is scaled based on a ratio between the first format and a selected video format to produce a scaled video stream. Similarly, the graphics data of the graphics data stream is scaled based on a ratio between the second format and a selected graphics format in order to produce a scaled graphics stream. The scaled video stream and the scaled graphics stream are then merged to produce a video graphics output stream.

11 Claims, 4 Drawing Sheets

METHOD AND APPARATUS FOR INDEPENDENT VIDEO AND GRAPHICS SCALING IN A VIDEO GRAPHICS SYSTEM

FIELD OF THE INVENTION

The invention relates generally to video graphics processing and more particularly to a method and apparatus for independent video and graphics scaling in a video graphics system.

BACKGROUND OF THE INVENTION

Video information and rendered graphical images are being combined in an increasing number of applications. Examples include animated icons, on-screen menus, video windows in a graphical display, etc. Typically, in these applications the video information is generated separately from the graphical information and the two must be combined before being output to a display device.

In many cases, video information is received in a format with a non-square pixel raster suitable for an expected screen aspect ratio. The aspect ratio is determined based on the ratio between the width of the screen or display area and the height of the screen. In contrast to the video information, graphics rendering systems typically format the graphics information based on a square pixel raster.

In prior art systems that combined separately generated video and graphics display information, the scaling of the video information to match the aspect ratio of the display was based upon the scaling of the graphics information, and the limitations of the graphics scaling controlled the limitations of the video scaling. This technique was suitable for computer graphics displays in which a small window was allotted to video display. In other systems, such as televisions that used closed captioning, graphics scaling systems were not present, and graphics data was rendered to non-square pixel graphics. In this case, the graphics information was limited by the video raster limitations.

Systems in which the video scaling is a subset of the graphics scaling require large amounts of memory to contain both the video information and the graphical information. This is problematic and wasteful in video systems that display or process only a small amount of graphics data. For example, if the video display information uses the entire display screen while the graphics display information requires only a small portion of the display, the amount of memory allotted to the graphics information will need to encompass the entire frame in order to allow the video information to use the entire frame.

Allocating large amounts of memory in the video graphics circuit to graphics information when a smaller amount of memory is adequate wastes both memory storage space and memory bandwidth. The wasted memory bandwidth is especially problematic in video graphics systems that display real time video. In such systems, the demands of the video portion of the display are very demanding upon the memory, and efficient utilization of the memory by the graphics portion of the display is crucial. For example, in the case where an animated icon is superimposed on a video display, the video information requires the entire display, but the graphics information merely requires a small amount of screen space. In prior art scaling systems where the graphics scaling controls the amount of scaling allowed for the video display information, memory corresponding to the entire display would need to be allocated for graphics information. Considering only the small amount of memory is needed to store the limited amount of graphics information, the majority of the memory allocated for graphics information is wasted.

Therefore, a need exists for a video graphics system that allows video information and graphical information to be scaled independently.

DETAILED DESCRIPTION OF A PREFERRED EMBODIMENT OF THE INVENTION

Figure 1:
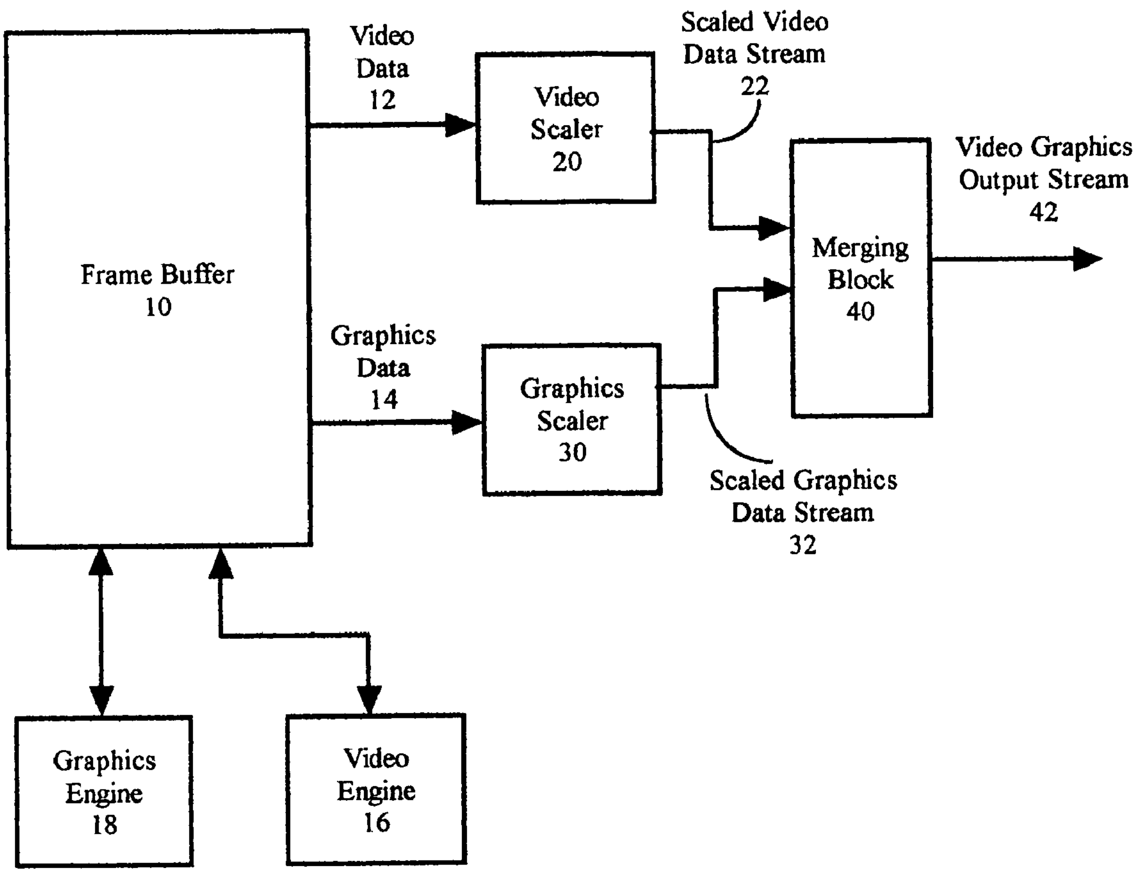
FIG. 1 illustrates a block diagram of a video graphics circuit in accordance with the present invention.

Generally, the present invention provides a method and apparatus for independent video and graphics scaling in a video graphics system. This is accomplished by receiving a video data stream that includes video data in a first format. A graphics data stream is also received, and the graphics data stream includes graphics data in a second format. The video data of the video data stream is scaled based on a ratio between the first format and a selected video format to produce a scaled video stream. Similarly, the graphics data of the graphics data stream is scaled based on a ratio between the second format and a selected graphics format in order to produce a scaled graphics stream. The scaled video stream and the scaled graphics stream are then merged to produce a video graphics output stream. By scaling the video data stream separately from the graphics data stream prior to merging the two streams, independent scaling of the two streams is accomplished in a mixed video graphics display.

The independent scaling of the two streams is important in the maintenance of proper aspect ratios when video data is received in a first format and graphics data is received in a second format while both must be scaled to match the desired format of the selected video format. In many systems, video information is presented in a non-square pixel format. This first format is typically utilized in television-type displays. In graphics systems, the graphics information is typically configured in a square pixel format, which is compatible with computer monitors and the like. An example of an application in which the dual scaling approach is beneficial is High Definition Television (HDTV) in which both square and non-square pixel formats are possible. Separate scaling of the video and graphics information allows both streams to be scaled to suit the type of display format that is selected.

Independent scaling of the video information and the graphical information allows memory to be allotted based on the needs of each type of display information. By separating the scaling operations between the video data path and the graphics data path, the two paths become more independent. Thus, when the video information requires a large amount of memory, such as in a television display that includes a small, animated graphics element in one corner, the graphical data need not be allocated as much memory. Independent scaling allows for more efficient use of the system memory, which in turn allows for faster processing of the video and graphics display information.

The display aspect ratio in a video graphics system is determined based on the height and width of the screen and its resolution. For example, HDTV may have a display that is 1920×1080 pixels. The image that is eventually displayed on such a screen may be composed of both video information and graphical information. When received, the video information may have an initial aspect ratio of 720×480. Similarly, the graphical information which may have an initial aspect ratio corresponding to a computer monitor may have dimensions of 640×480. In order to be accurately displayed on the HDTV screen, the video information must be scaled to suit the aspect ratio of the output screen. The same requirement applies to the graphical information. By allowing these two types of information to be scaled independently in this type of a system, maximum flexibility can be provided in terms of data storage and scaling.

The invention can be better understood with reference to FIGS. 1-4. FIG. 1 illustrates a video graphics integrated circuit that includes a frame buffer 10, a video scaler 20, a graphics scaler 30, and a merging block 40. The frame buffer 10 stores video data and graphics data. The video data stored in the frame buffer 10 may be video data corresponding to an MPEG data stream that is received and decoded by video engine 16, and the graphics data may be the product of graphics engine 18. Video data can include a variety of video data formats that are recognized in the industry, including YUV, RGB, YCrCb, YPrPb, and the like. In some cases this data format is converted to a different format for display, and in such cases, the color conversion can take place at various points in the system. Throughout this specification, it is understood that the positioning of the specific circuitry that performs the color conversion is not crucial to the general teachings provided herein. It is also understood that color conversion can include the operations of gamma correction and color adjustment.

In another embodiment, the video data and the graphics data may be received by the video graphics system in a unitary stream which is then divided between the received video data and the received graphics data, both of which are stored in the frame buffer 10. Such a stream of video and graphics data may be transmitted for display on a device such as a HDTV set. The video data may include video images typically associated with a television display, and the graphics data might include menu information or a spinning logo to be displayed in a small portion of the screen.

The video scaler 20 is operably coupled to the frame buffer 10 and receives video data 12 which the video scaler 20 scales to produce a scaled video data stream 22. The scaling performed by the video scaler 20 is based on a ratio between the eventual display aspect ratio and the aspect ratio of the images in the video data stream 12. Similarly, the graphics scaler 30 receives graphics data 14 from the frame buffer 10 and scales the graphics data 14 to produce scaled graphics data stream 32. The graphics scaler 30 scales the graphics data 14 based on the aspect ratio of the graphics portion of the display, and the aspect ratio of the graphics data in its current form.

Figure 2:
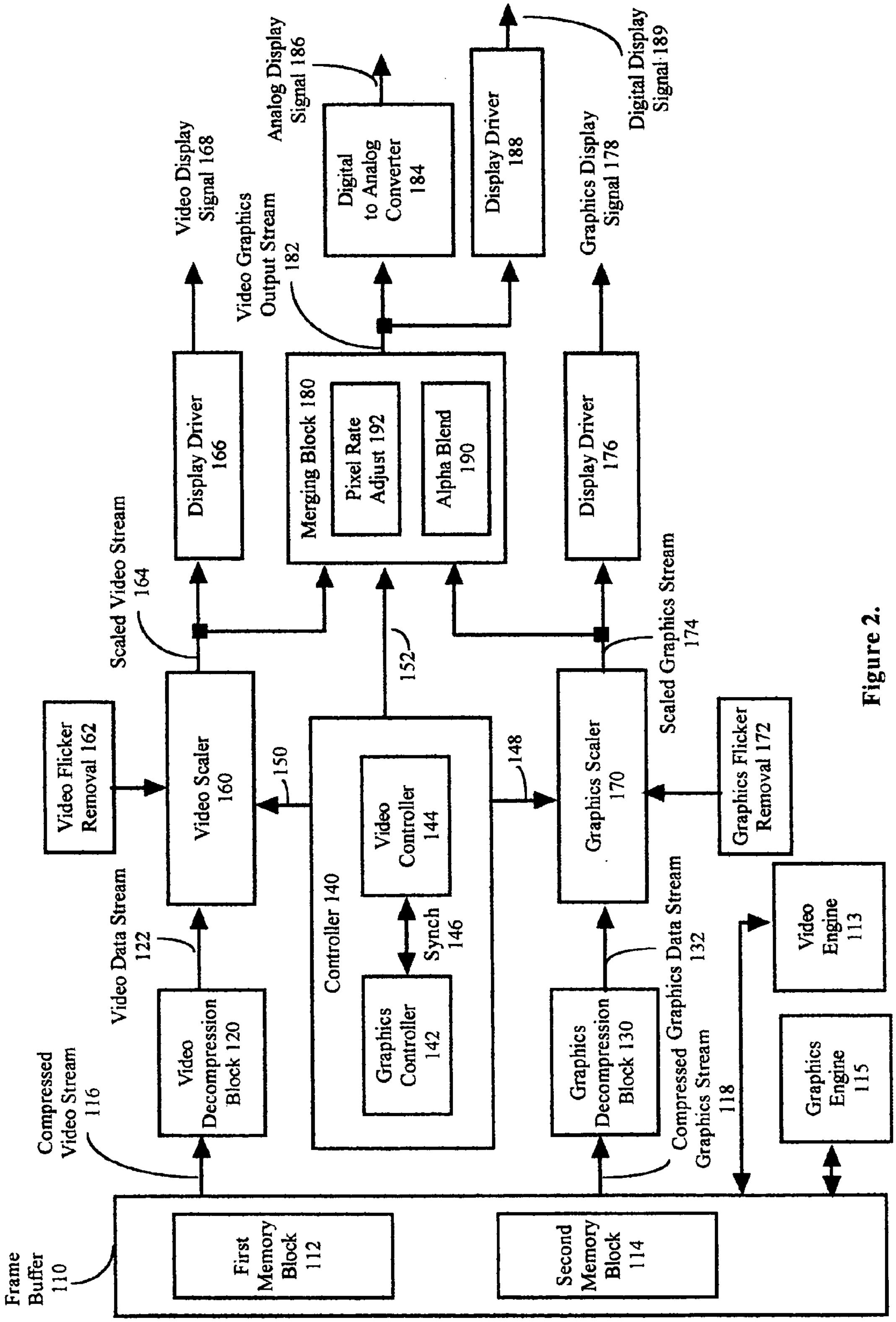
FIG. 2 illustrates a block diagram of a video graphics display engine in accordance with the present invention.

The merging block 40 receives the scaled video data stream 22 and the scaled graphics data stream 32 and merges the two data streams to form video graphics output stream 42. The video graphics output stream 42 combines the scaled versions of both the video stream and the graphics stream in order to produce the output, which may be eventually provided to a monitor or television set for display. By allowing the video data and the graphics to be scaled independently and later combined to produce a final output stream, the circuit illustrated in FIG. 1 provides more flexibility than prior art solutions that included only one scaler. FIG. 2 illustrates a video graphics display engine that includes a controller 140, a video scaler 160, a graphics scaler 170, and a merging block 180. Preferably, the video graphics display engine further includes a first memory block 112 and a second memory block 114. Each of the memory blocks stores video and/or graphics data for display. More preferably, the first memory block 112 and the second memory block 114 are portions of a frame buffer 110 included in the video graphics system. The video graphics display engine illustrated in FIG. 2 is preferably implemented on a single integrated circuit that may contain additional circuitry. In one embodiment, such a system receives a video graphics signal which contains both video data and graphical data, and the system separates the video data from the graphics data and stores each in its respective portion of the frame buffer 110. Preferably, the video information is video information that may be received in a compressed MPEG format.

In another embodiment, the graphics data stored in the frame buffer 110 is generated by a graphics engine 115, which may perform graphics rendering operations based on input from an external processor. Similarly, the video data in the memory may be generated by video engine 113, which may receive and decode a video data stream and generate video images that are then stored as video data in the frame buffer 110.

The video scaler 160 is adapted to receive video data stream 122, which is preferably retrieved from the first memory block 112. If the video data stream 122 is stored in the first memory block 112 as a compressed video stream 116, a video decompression block 120 may be employed in the system to decompress the compressed video stream 116.

The video scaler 160 scales video images in the video data stream 122 based on a ratio between the video images which are presented in a first format in the video data stream 122 and an output video image format. The result of the scaling of the video data stream 122 is a scaled video stream 164. When scaling the video data stream 122, the video scaler 160 may be at least partially controlled by control signals 150 received from the controller 140. Preferably, the control signals 150 provide details about the display, including synchronization signals and formatting parameters.

The graphics scaler scales graphical images, or data, in the graphics data stream 132 based on the ratio between the graphics images received in the graphics data stream 132 and the desired output graphics image. Preferably, the graphics data stream 132 is retrieved from the second memory block 114. If the data is stored in the second memory block 114 in a compressed format, the graphics decompression block 130 is used to convert the compressed graphics stream 118 to the graphics data stream 132.

The aspect ratio of the images in the graphics data stream 132 may not match the aspect ratio of the eventual display. In such a case, the graphics scaler must adjust this aspect ratio in order to suit the requirements of the eventual display. One example is converting square pixels to a non-square pixel format. Note that the scaling of the graphics data stream 132 is independent of the scaling of the video data stream 122. The aspect ratio of the images in the video data stream 122 may be completely different from the aspect ratios of the images in the graphics data stream 132, and the video scaler 160 and the graphics scaler 170 can independently adjust the aspect ratios to suit the requirements of the display.

Preferably, the graphics scaler 170 scales the graphics data stream 132 to produce scaled graphics stream 174 based on control information 148 received from the controller 140. The control information 148 received from the controller 140 provides the graphics scaler 170 with the information it requires in order to perform the scaling function. This information can include synchronization signals, display characteristics, or information that will eventually aid in merging the video and graphics streams.

In one embodiment, the controller 140 provides synchronization information to both the video scaler 160 and the graphics scaler 170. Preferably, the controller 140 receives boundary information regarding the display and provides control signals to the scaler blocks in order to allow the scalers to correctly scale the image data. In another embodiment, the controller 140 includes a graphics controller 142 and a video controller 144 that are synchronized with a synchronization signal 146. In such an embodiment, the graphics controller 142 issues the control information 148 required by the graphics scaler 170. Similarly, the video controller 144 produces the control information 150 for the video scaler 160. If the video information and the graphics information are eventually to be combined, synchronization of the graphics controller 142 and the video controller 144 is important. If the video information and the graphics information are not to be combined, synchronization is not required to produce the discrete video display and graphics display signals 168 and 178.

The merging block 180 is operably coupled to the video scaler 160 and the graphics scaler 170. The merging block 180 combines the scaled video stream 164 with scaled graphics stream 174 to produce a video graphics output stream 182. Preferably, the merging performed by the merging block 180 is based on merging control information 152 received from the controller 140. The merging control information 152 may include synchronization signals, boundary information, blending ratios, or other information that affects the merging performed by the merging block 180.

The merging block 180 may perform an alpha blending of the scaled video stream 164 and the scaled graphics stream 174. This may be accomplished via the alpha blend block 190. Alpha blending produces translucent or transparent effects in the combination of the video images and the graphics images. For example, a graphical logo displayed on the screen may be partially or fully translucent to allow the video images at the same location to be seen “behind” the translucent graphical logo. The video images are blended with the logo to produce the visual effect of translucence.

The merging block 180 may also include a pixel rate adjusting block 192. The pixel rate adjusting block 192 can alter the pixel rate of the video graphics output stream 182 such that more efficient scaling of the images of the video data stream 122 or the graphics data stream 132 is possible. For example, if the horizontal portion of the aspect ratio of the output display is close to a multiple of the horizontal portion of the aspect ratio of the input data stream 122, the video pixel rate of the video graphics output stream 122 may be altered to change the horizontal dimension of the output display. If the dimension is altered to form the multiple of the horizontal portion of the aspect ratio of the video data stream 122, the ratio between the output stream and the input stream may become a simple number. Because scaling can require many mathematical operations, the video scaler can perform scaling much more efficiently with such a simple ratio than with a complex ratio that would require much more processing power.

The display engine illustrated in FIG. 2 may also include a digital-to-analog converter (DAC) 184 which converts the video graphics output stream 182, which is in a digital format, to an analog display signal 186. Typically, television sets require an analog display signal. However, in other embodiments display driver 188 may be included in the system to provide a suitable output signal for digital display devices. The display driver 188 is adapted to receive the digital video graphics output stream 182 and present in it for display on a digital device via the digital display signal 189.

In other embodiments, there may be a need to display the video information alone or the graphics information alone. In such instances, the system may be equipped with display drivers 166 and/or 176. The display driver 166 receives the scaled video stream 164 from the video scaler 160 and produces a video display signal 168 for display. Similarly, the display driver 176 receives the scaled graphics stream 174 and produces graphics display signal 178. The display drivers 166 and 176 may be capable of providing an analog output, a digital output, or both.

In video graphics applications, removal of flicker can be important to maintaining a clean, continuous display image. In order to accomplish this, the display engine of FIG. 2 may further include a video flicker removal block 162 and/or a graphics flicker removal block 172. Flicker removal attenuates vertical spatial frequencies that appear to flicker when the image is displayed on an interlaced television or monitor. For example, a pattern of alternating white and black lines will flicker if all of the white lines are displayed on even fields and all of the black lines on odd fields. Flicker removal will gray out this pattern to produce a more uniform intensity in both of the fields. Flicker removal may be accomplished by performing a weighted average of the pixels surrounding a target pixel to determine the resulting value for the target pixel. The weighted average typically only uses surrounding pixels that are vertically aligned on the display with the target pixel. This phenomenon is normally only encountered with graphics displays and therefore it is more likely that the graphics flicker removal block 172 would be included in the system. However, video flicker removal may become an issue for certain applications and in such cases the video flicker removal block 162 would be desirable. The video flicker removal block 162 is coupled to the video scaler 160 and the video flicker removal may occur during the scaling process. Similarly, the graphics flicker removal block 172 is coupled to the graphics scaler 170 and the graphics flicker removal may occur during the scaling of the graphics data. In other embodiments, the flicker removal circuitry may be fully integrated into the scaling circuitry of the scaling blocks.

Note that the system illustrated in FIG. 2 may be expanded to include a plurality of video scalers and/or graphics scalers. In such a system there may be multiple sources of video data or multiple sources of graphics data that need to be scaled for output to a common display. In such cases, the appropriate number of video scalers and graphic scalers may be included in the system in order to accommodate the multiple data streams.

In other systems, there may be multiple displays that are driven by the same video data and graphics data. In such system, the needs of the displays may vary, and in such cases multiple video and/or graphics scalers may be employed to scale the same video and graphics data streams to suit the needs of each of the individual displays. Note that in such systems the appropriate control circuitry will also need to be implemented. As described earlier, the control circuitry receives boundary information regarding the display and provides control signals to the scaler blocks in order to allow the scalers to correctly scale the data streams.

Figure 3:
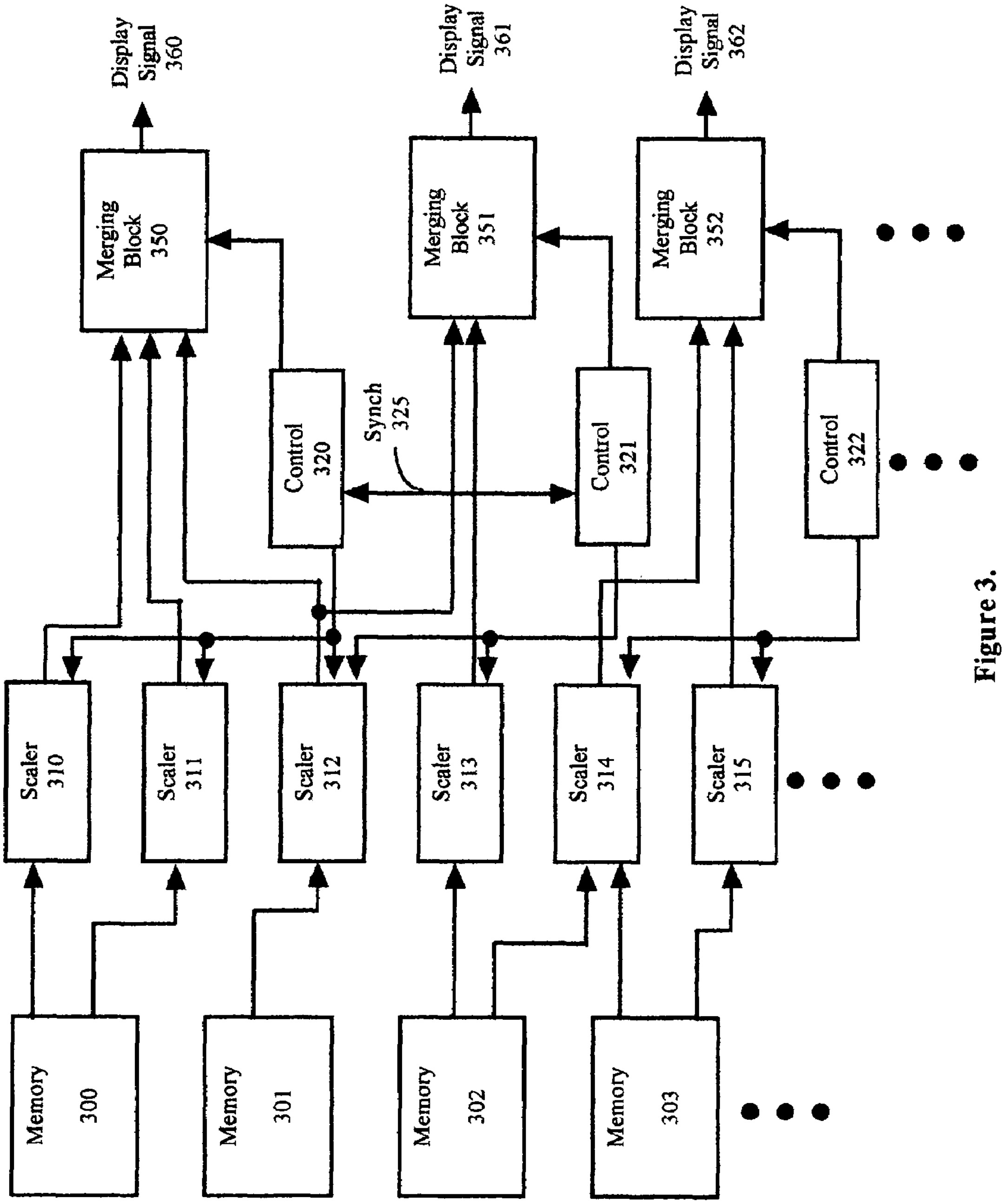
FIG. 3 illustrates a block diagram of an alternate video graphics display engine in accordance with the present invention.

FIG. 3 illustrates a potential multi-scaler system that includes a plurality of memory blocks 300-303 that store video data, graphics data or both video and graphics data. A plurality of scalers 310-315 are coupled to the memory block 300-303. The plurality of scalers may include specific video scalers or graphics scalers, or the scalers may be general purpose scalers that can scale either type of data. As is illustrated, multiple scalers can be coupled to a single memory, thus allowing video and graphics data to be shared between multiple scalers. Data decompression and flicker removal blocks as illustrated in FIG. 2 may be included in the system of FIG. 3 if required.

Each of the scalers 310-315 receives control information from one of a plurality of control blocks, or controllers, 320-322. One controller may control all of the scalers for a single display or multiple, synchronized controllers may be used to control each of the scaling blocks that feeds a particular display. A plurality of merging blocks 350-352 receive the scaled data streams from the plurality of scalers 310-315 and merge the scaled data to produce the plurality of display signals 360-362. The merging performed by the merging blocks 350-352 may be based on additional control information received from the control blocks 320-322. As in FIG. 2, the merging blocks may also perform alpha blending or pixel rate adjusting. The display signals 360-362 may be analog, digital, or configurable such that either an analog or a digital system can be driven by a particular output signal.

Multiple merging blocks may share a single scaled data stream. This is illustrated in FIG. 3 where merging blocks 350 and 351 share the output of the scaler 312. In such an instance, the control blocks 320 and 321 are preferably synchronized by synch signal 325. This ensures that the scaling operations directed by the control blocks are compatible and will be performed at the proper rate with respect to each of the displays.

Note that the system illustrated in FIG. 3 may be designed to be both flexible and reconfigurable such that as the display needs change, couplings within the system can be altered to provide the required data paths for video and graphics information. By allowing multiple scaling engines to independently scale multiple data streams, many different display formats can be accommodated with minimal waste of memory resources. It should be apparent to one skilled in the art that once the dependence of multiple data streams on a single scaling engine is removed, many different combinations of the independent scaling engines is possible. For example, multiple scaling engines may be cascaded in series to achieve a number of differently scaled intermediate streams and a final data stream, all of which could be merged with other data streams in separate or common merging blocks.

Preferably, the circuit illustrated in FIG. 3 is implemented as an integrated circuit that includes the plurality of scalers 310-315, the plurality of controllers 320-322, and the plurality of merging blocks 350-352. The memory blocks 300-303 utilized by such an integrated circuit may all be located external to the integrated circuit. However, in other embodiments, one or more of the memory blocks 300-303 may be included in the integrated circuit. It should be apparent to one of ordinary skill in the art that tradeoffs exist between die area of the integrated circuit, which will increase by including the memory in the integrated circuit, and speed of memory accesses from the memory blocks, which will increase by including the memory in the integrated circuit. Including the memory in the integrated circuit will also reduce the number of component parts required to implement the system shown in FIG. 3. These tradeoffs will likely be taken into account in designing the circuit for various applications, and it should be understood that the invention described herein encompasses all such variations.

Figure 4:
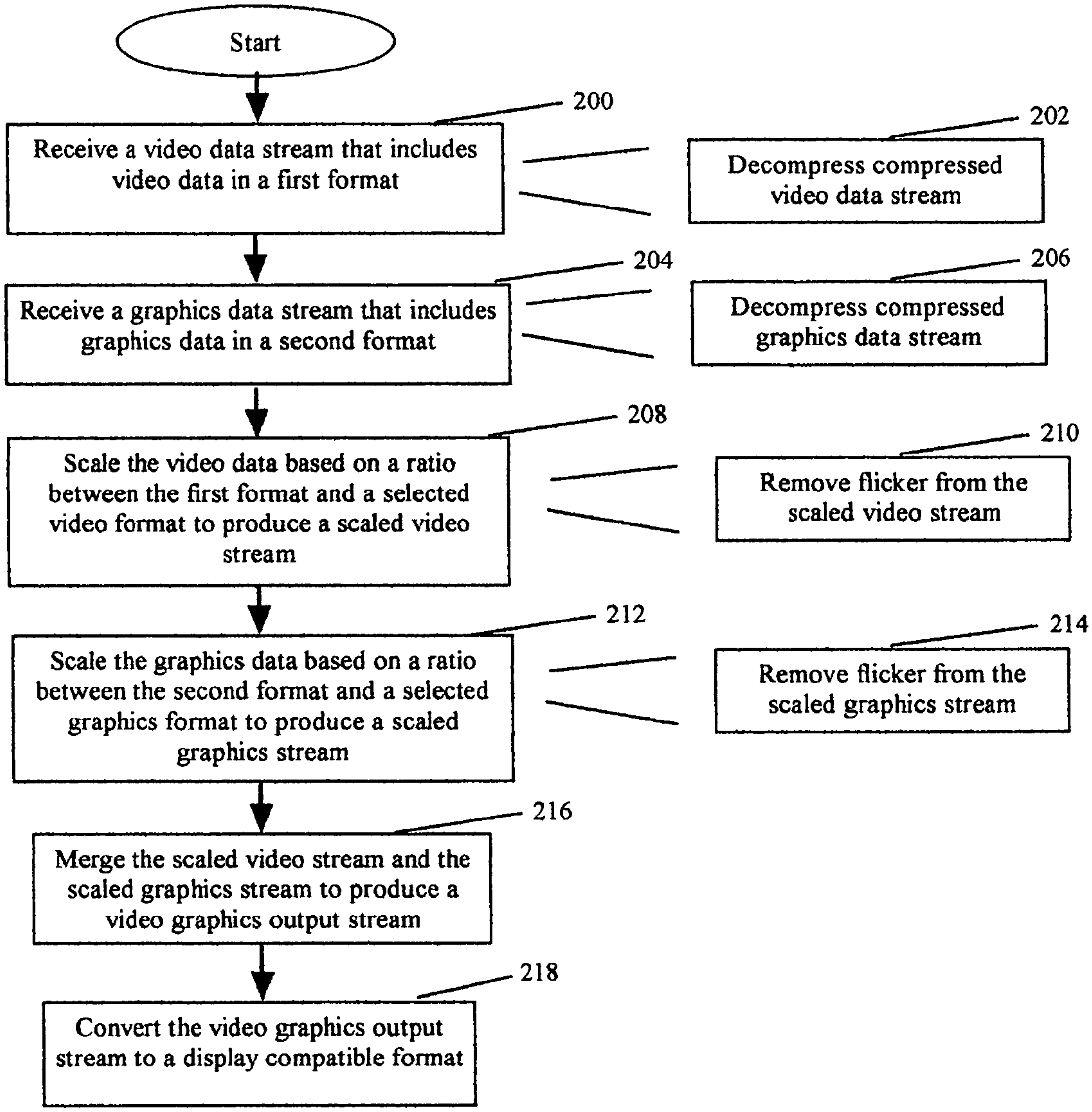
FIG. 4 illustrates a flow chart of a method for displaying video graphics data in accordance with the present invention.

FIG. 4 illustrates a flow chart of a method for displaying video graphics data. At step 200, a video data stream is received that includes video data in a first format. Preferably, the first format corresponds to the aspect ratio of the video images. The video data stream may be from a frame buffer or it may be provided by a different source. If the video data stream is received in a compressed format, at step 202, the compressed video data stream is decompressed.

At step 204, a graphics data stream is received. As with the video data stream, the graphics data stream may be fetched from a frame buffer or another memory in a video graphics circuit. The graphics data stream includes graphics data in a second format, which preferably corresponds to the aspect ratio of the graphics images in the stream. The second format may include alpha information for the graphics images, where the alpha information is scaled along with the other portions of the graphics images. If the graphics data stream is received in a compressed format it is decompressed at step 206 in order to produce a graphics data stream in an uncompressed format.

At step 208, the video data stream is scaled to produce a scaled video stream. The scaling performed at step 208 is based on the ratio between the first format and a selected video format. As stated earlier, the first format may be the aspect ratio of the images in the video data stream. The selected video format may be the aspect ratio of the display used in conjunction with the method. The scaling may also be based on video data control information that may include synchronization information, boundary information, and other relevant scaling information. The scaling performed at step 208 may further include step 210 which removes flicker from the video data stream. At step 212, the graphics data is scaled based on a ratio between the second format and the selected graphics format in order to produce a scaled graphics stream. As with the video data, the scaling of the graphics data may be based upon the aspect ratio of the images within the graphics stream compared with the aspect ratio of the display. The scaling may also be based on graphics data control information that may include synchronization, boundary information, and other relevant scaling information. Step 212 may include the removal of the flicker from the scaled graphics stream, which is accomplished in step 214. It should be noted that the receipt and scaling of the video data and the graphics data may be performed in parallel, and the sequential ordering of the steps in the Figure should not be viewed as a limitation.

At step 216, the scaled video stream and the scaled graphics stream are merged to produce a video graphics output stream. This output stream is typically in a digital format and may be suitable for direct display on devices that accept a digital stream. The merging performed at step 216 may include an alpha blending operation that provides translucent effects. In other words, the graphics information may have a varying level of opaqueness, thus allowing a viewer to see video information through the graphics data or vice-versa.

At step 218, the video graphics output stream is converted to the display compatible format. This may include converting the digital stream into an analog signal for display on a television set or formatting the digital data to a preferred format for a digital display device.

As was described with respect to FIGS. 2 and 3, the method of FIG. 4 may be utilized in a system that includes a plurality of display devices. In such a case, the video data or graphics data may be scaled based on a plurality of selected video formats in order to produce a plurality of scaled video streams and/or scaled graphics streams. Each scaling step in such a system would be performed independently of the other scaling operations. Preferably, the scaling factors in each of the scaling operations is based on the ratio between the selected video format and the format of the video or graphics data which is being scaled.

The method of FIG. 4 allows the video information and graphics information for display to be scaled independently of each other. This allows memory in a frame buffer of a video graphics integrated circuit to be allocated in a flexible and efficient manner such that large blocks of memory are not left idle or wasted. Reducing the amount of memory required for either the video or the graphics portion of the display also relieves some of the bandwidth burden on the frame buffer. If fewer memory locations are used, fewer data reads and writes will be required to maintain these locations, which results in additional available memory bandwidth.

Thus, the efficient use of memory and the reduced bandwidth usage allows the system to display images in a more efficient and faster manner. The method also allows for maximum flexibility in terms of display windows for video, graphics, or a combination of the two. These are significant advantages over prior art systems in which a single scaler curtails the flexibility of the video and graphics scaling in the system. In such systems, either the video information or the graphics information controlled scaling in the system and the other was required to meet the requirements set. These limitations are not experienced by the method and apparatus described herein.

It should be understood that the implementation of other variations and modifications of the invention in its various aspects should be apparent to those of ordinary skill in the art, and that the invention is not limited to the specific embodiments described. For example, additional processing may be performed after scaling prior to merging the video information with the graphics information to produce the output for display. It is therefore contemplated to cover by the present invention, any and all modifications, variations, or equivalents that fall within the spirit and scope of the basic underlying principles disclosed and claimed herein.

What is claimed is:

1. A video graphics display engine comprising:

a video scaler adapted to receive a video data stream in a first format, wherein the video scaler scales video images in the video data stream based on a ratio between the video images in the first format and an output video image to produce a scaled video stream;

a graphics scaler adapted to receive a graphics data stream in a second format, wherein the graphics scaler scales graphics images in the graphics data stream based on a ratio between the graphics images in the second format and an output graphics image to produce a scaled graphics stream;

a merging block operably coupled to the video scaler and the graphics scaler, wherein the merging block combines the scaled video stream and the scaled graphics stream to produce a video graphics output stream; and a single frame buffer operably coupled to the graphics scaler and to the video scaler, the single frame buffer further comprises a first memory block and a second memory block, wherein the stream of video data is fetched from the first memory block and the stream of graphics data is fetched from the second memory block, wherein the merging block further comprises circuitry which configures a pixel rate of the video graphics output stream to produce a preferred video scaling ratio, wherein the preferred video scaling ratio is based on the ratio between the video images in the first format and the output video image.

2. A video graphics display engine comprising:

a video scaler adapted to receive a video data stream in a first format, wherein the video scaler scales video images in the video data stream based on a ratio between the video images in the first format and an output video image to produce a scaled video stream:

a graphics scaler adapted to receive a graphics data stream in a second format, wherein the graphics scaler scales graphics images in the graphics data stream based on a ratio between the graphics images in the second format and an output graphics image to produce a scaled graphics stream;

a merging block operably coupled to the video scaler and the graphics scaler, wherein the merging block combines the scaled video stream and the scaled graphics stream to produce a video graphics output stream; and a single frame buffer operably coupled to the graphics scaler and to the video scaler, the single frame buffer further comprises a first memory block and a second memory block, wherein the stream of video data is fetched from the first memory block and the stream of graphics data is fetched from the second memory block.

wherein the merging block further comprises circuitry which configures a pixel rate of the video graphics output stream to produce a preferred graphics scaling ratio, wherein the preferred graphics scaling ratio is based on the ratio between the graphics images in the second format and the output graphics image.

3. A video graphics display engine comprising:

a video scaler adapted to receive a video data stream in a first format, wherein the video scaler scales video images in the video data stream based on a ratio between the video images in the first format and an output video image to produce a scaled video stream;

a graphics sealer adapted to receive a graphics data stream in a second format, wherein the graphics scaler scales graphics images in the graphics data stream based on a ratio between the graphics images in the second format and an output graphics image to produce a scaled graphics stream;

a merging block operably coupled to the video scaler and the graphics scaler, wherein the merging block combines the scaled video stream and the scaled graphics stream to produce a video graphics output stream;

a single frame buffer operably coupled to the graphics scaler and to the video scaler, the single frame buffer further comprises a first memory block and a second memory block, wherein the stream of video data is fetched from the first memory block and the stream of graphics data is fetched from the second memory block; and a graphics decompression block operably coupled to the graphics scaler, wherein the graphics decompression block receives a compressed stream of graphics data and decompresses the compressed stream of graphics data to produce the graphics data stream.

4. A method for displaying video graphics data comprising:

receiving a video data stream, wherein the video data stream includes video data in a first format;

allocating a first block of a memory in a frame buffer for storing the video data stream, the allocating based upon memory needs of the video data stream;

receiving a graphics data stream, wherein the graphics data stream of includes graphics data in a second format;

allocating a second block of the memory in a frame buffer for storing the graphics data stream, the allocating based upon memory needs of the graphics data stream;

scaling the video data based on a ratio between the first format and a selected video format to produce a scaled video stream;

scaling the graphics data based on a ratio between the second format and a selected graphics format to produce a scaled graphics stream; and merging the scaled video stream and the scaled graphics stream to produce a video graphics output stream, wherein receiving the graphics data stream further comprises receiving the graphics data stream in a compressed format, wherein the graphics data stream is decompressed prior to scaling.

5. A video graphics circuit comprising:

a plurality of memory blocks, wherein each of the plurality of memory blocks stores at least one of video data and graphics data;

a plurality of video scalers, wherein each of the plurality of video scalers is coupled to at least one of the plurality of memory blocks, wherein each video scaler of the plurality of video scalers independently scales at least a portion of the video data to produce a scaled video data stream of a plurality of scaled video data streams independent from the other scaled video data streams of the plurality of scaled video data streams;

a plurality of graphics scalers, wherein each of the plurality of graphics scalers is coupled to at least one of the plurality of memory blocks, wherein each graphics scaler of the plurality of graphics scalers independently scales at least a portion of the graphics data to produce a scaled graphics data stream of a plurality of scaled graphics data streams independent from the other scaled graphics data streams of the plurality of scaled graphics data streams; and a plurality of merging blocks, wherein each of the merging blocks is operably coupled to at least one video scaler of the plurality of video scalers and at least one graphics scaler of the plurality of graphics scalers such that each of the merging blocks receives a plurality of scaled data streams, wherein each merging block combines received scaled data streams to produce a video graphics output stream of a plurality of video graphics streams.

6. The video graphics circuit of claim 5, wherein the plurality of video scalers, the plurality of graphics scalers, and the plurality of merging bocks are included in an integrated circuit.

7. The video graphics circuit of claim 6, wherein at least a portion of the plurality of memory blocks is included in the integrated circuit.

8. The video graphics circuit of claim 5 further comprises a plurality of controllers, wherein each of the plurality of controllers is operably coupled to at least one scaler of a combined set of scalers that includes the plurality of graphics scalers and the plurality of video scalers, wherein each of the plurality of controllers provides separate control information that controls independent scaling by scalers to which it is coupled.

9. The video graphics circuit of claim 8, wherein each of the plurality of controllers provides merging control information to one of the plurality of merging blocks, wherein the merging control information is used in combining the received scaled data stream by each merging block.

10. The video graphics circuit of claim 5, wherein each of the plurality of merging blocks perform alpha blend operations to combine the received scaled data streams.

11. The video graphics circuit of claim 5, wherein the plurality of merging blocks produces the plurality of video graphics output streams in at least one of an analog display format and a digital display format.

* * * * *